March 15, 1938.  C. L. MILLER  2,111,535

FLOUR MILL

Filed June 14, 1933

INVENTOR
Clarence L. Miller
BY Thos. E. Hegfield
ATTORNEY

Patented Mar. 15, 1938

2,111,535

UNITED STATES PATENT OFFICE 2,111,535

FLOUR MILL

Clarence L. Miller, Kansas City, Mo., assignor to Webb Belting Company, Kansas City, Mo., a corporation of Missouri Application June 14, 1933, Serial No. 675,763

1 Claim. (Cl. 83—12)

My invention relates to flour mills and more particularly to an improved finishing roll for the flour, provided with means to keep the finishing rolls clean.

After flour is roughly milled, it is passed through pulverizing finish rolls. These rolls are usually about ten inches in diameter and from thirty to thirty-six inches long, and weigh from 650 to 800 pounds apiece. They are made of cast chilled steel, and have an extremely smooth surface. The roughly milled flour passes between these rolls and is very finely pulverized. If the flour contain any moisture or if the atmosphere be humid and a certain amount of moisture is adsorbed by the flour, it will exhibit a decided tendency to adhere to the surfaces of the rolls. It frequently happens that, unless some means is provided for keeping the surface of the rolls clean, a coating of flocculated flour will form on the rolls. This has several deleterious effects. The rolls, of course, are mounted in absolute alignment and their surfaces are as true as it is possible to make them. A coating of flour, applied on the surface of the roll will tend to force the rolls apart, putting severe strain upon the bearings. It frequently happens that the rolls may become so clogged that they become jammed. This results in what is commonly known as a "back-up". A "back-up" causes several inconvenience and involves a loss of time in clearing the same.

It has been the practice in flour mills today to provide some sort of means to attempt to keep the rolls free of adhering flour. The devices which have been used to date keep the flour clear of the rolls by a rubbing action. The erosion of the adhering flour has been effected by means of cast iron scrappers or the like. Sometimes they have been made of mild iron. In order to make these devices of the prior art serve their function, it was necessary to provide weights or the like to hold the rubbing surfaces against the rolls with a degree of pressure. Thus resulted in creating a tremendous friction as will be readily understood from the fact that the rolls revolve at a high speed. The friction occasioned heat and, if the flour was moist, an action similar to baking would occur and a thin pancake-like coating would frequently be formed on the rolls which it was impossible for the rubbing blades to remove. This necessitated the stopping of the mill and the cleaning off of such "back-up" as might have occurred. Then, too, injury was frequently done to the bearings on which the rolls were mounted necessitating further repairs. With the devices of the prior art, it was necessary to renew the rubbing blades frequently, the average being about once every three weeks and, in no case has a rubbing blade of the prior art lasted more than three months to my knowledge.

One object of my invention is to provide a pair of finishing rolls provided with cutting blades adapted to delaminate the adhering flour as distinguished from the rubbing action or erosion which has been practiced by the devices of the prior art.

Another object of my invention is to provide means for keeping the rolls clear of flour with the use of very slight pressure or substantially no pressure to eliminate any heating of the rolls, thus obviating any baking action which has occurred by the use of the devices of the prior art.

A further object of my invention is to provide a device for keeping milling rolls clear of flour, which will not have to be replaced frequently.

A further object of my invention is to provide a cutting blade which has a plurality of cutting edges so that the same blade may be used for a long period of time.

A further object of my invention is to provide a cutting blade which is very highly polished and is made of a material which will retain its high polish to prevent adherence of any of the material cut from the rolls, to the cutting blade.

Other and further objects of my invention will appear from the following description.

As pointed out above, the scraper blades which rub the flour from the rolls, are made of cast iron or mild iron. This material becomes oxidized very readily and I have found that it is due to its rough surface that its action is so ineffective. The comparatively high pressure which must be maintained on the scraper devices of the prior art has been necessitated largely by this fact. If no pressure is used, the rubbing action is ineffective, due to the fact that the flour will adhere to the rough surface and tend to spread the adhering moist flour, rather than to remove it. This spreading action could be overcome only by the use of pressure. I have eliminated the tendency of the flour to adhere to the scraping device by highly polishing the same.

In general, my invention contemplates the provision of an accurately formed cutting blade which will cut the adhering flour from the rolls, rather than to rub it off as has been done by the prior art devices. The cutting blades are formed of a stainless steel which is tempered to a Brinell hardness from 230 to 245. The tempered steel blade is then accurately ground so that the cutting edges are absolutely straight and parallel to each other. After the grinding of the blades, they are highly polished to preclude the danger of adherence of flour thereto. It will be appreciated that this is an important feature of my invention. In order to insure that the cutting edges are sharp, I hollow grind the upper and lower edges of the cutting blade. It will be observed that this will form four cutting edges. It is to be understood, of course, that my cutting blade will function satisfactorily if the edges are not hollow ground, the ninety degree edge being sufficiently sharp to accomplish the result.

In the accompanying drawing, which forms part of the specification and is to be read in conjunction therewith, and in which like numerals indicate like parts in the various views.

Figure 1:
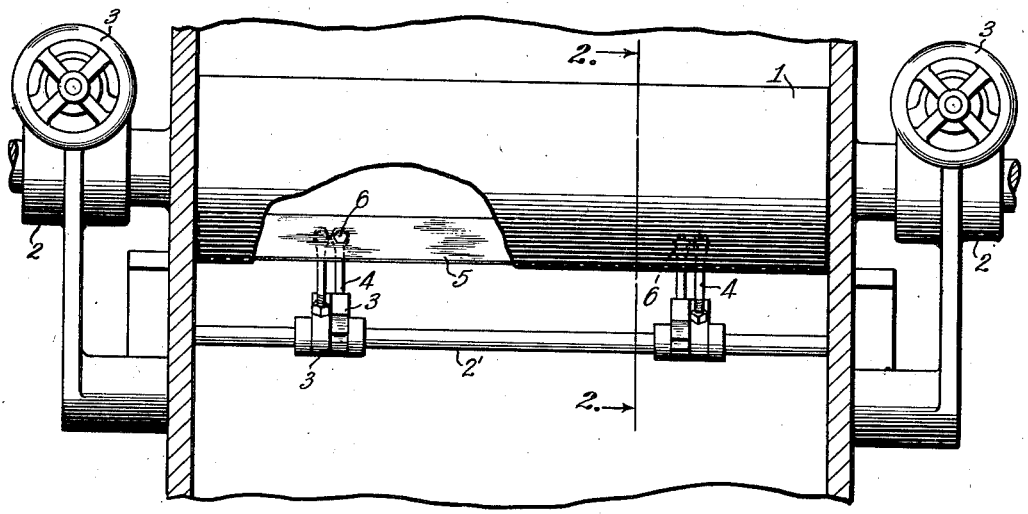
Figure 1 shows a side elevation of a pair of smooth rolls which finish the "middlings" equipped with one mode of carrying out my invention.
Figure 2:
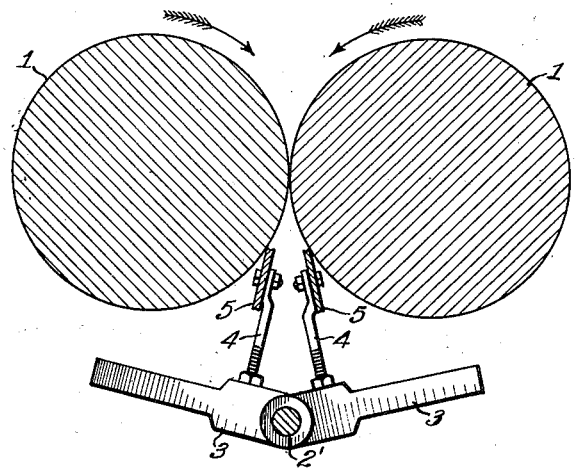
Figure 2 is a sectional view taken on the line 2—2 of Figure 1.
Figure 4:
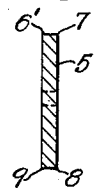
Figure 4 is a sectional view taken on the line 4—4 of Figure 3.
Figure 3:
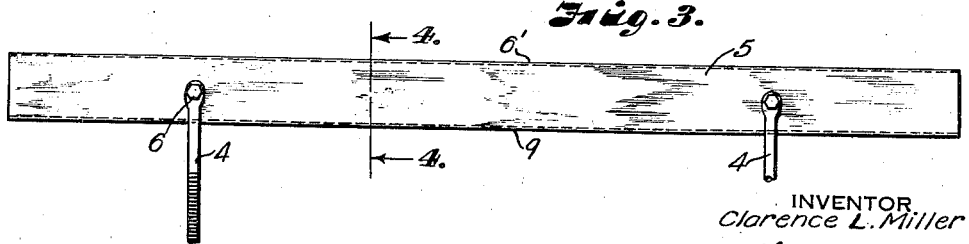
Figure 3 is an elevation of one of my cutting blades.

More particularly referring now to the drawing, a pair of rolls 1 are mounted in suitable bearings 2 which are equipped with adjusting devices 3. These rolls are well known in the art and are usually termed "smooth rolls". The wheat is ground by a step by step process, the wheat first being roughly ground to "sizings", the "sizings" then being ground to "middlings" and the "middlings" being progressively ground by smooth rolls which finally grind the flour into finely pulverized form. The rolls, which are usually made of cast chilled steel, have a very smooth surface. The "middlings" are fed to the top of the rolls which revolve in the direction shown by arrows in Figure 2. Below the rolls I provide a mounting means upon which to mount the blades. This mounting means, as shown, consists of a bar 2' upon which is pivotally mounted a plurality of members 3. These members carry adjustable supports 4 as can be readily seen by reference to Figure 2. It is to be understood, of course, that any suitable mounting means may be employed. The supports 4 carry the cutting blades 5. As shown in Figure 2, the cutting blades are removably mounted by means of bolts 6 which pass through suitable holes in the cutting blade 5. The cutting blades are made out of a non-corrosive steel, preferably stainless steel which is tempered to a Brinell hardness of between 230 and 245. The edges of the blade are accurately ground to form straight edges and it will be observed that four cutting edges, 6', 7, 8, and 9 are thus formed. The edges may be hollow ground to present sharper cutting edges. The blades are mounted so that the cutting edges are parallel to the respective axes of the rolls 1 and tangent to the rolls at points below said axes. The pressure with which the cutting blades touch the rolls is very slight. It will be observed that the blades in position as shown in Figure 2 will cut the adhering flour from the rolls rather than rub it off as was done by the devices of the prior art. Due to the fact that the blade is highly polished, there will be no danger of the flour adhering to the blade and causing "smearing". Due to the fact that the blades contact the rolls with slight pressure, very little friction is created. This will prevent the heating of the rolls and the deleterious effects caused thereby. Furthermore, the absence of pressure relieves the blade of considerable wear so that the combined slight pressure or substantially no pressure, and the hardness of the material will result in a very long life for the blade.

An experimental pair of blades has been installed in the Washburn-Crosby mills at Kansas City, Missouri. These blades have been operating experimentally a considerable period, with perfect results and without any change therein. It will be observed that, by means of my invention, rolls have been kept cleaner in a much more efficient manner. The erosion which was occasioned by the devices of the prior art resulted in the wearing off of the metal from the rubbing devices. This metal, of course, was deposited in the flour. Frequently, scale and other bits of foreign matter entered the flour. This, of course, was a serious disadvantage with respect to flour for human consumption. There is practically no detectable wear in the blades of my invention. It will be observed that my invention lies chiefly in the conception of using a highly polished hardened cutting edge as distinguished from a scraping edge. By making my cutting edge absolutely true, I am enabled to perform the work of keeping the rolls clean with substantially no friction and, at the same time, keep the rolls absolutely free of adhering flour.

It will be understood that certain features and sub-combinations are of utility and may be employed without reference to other features and sub-combinations. This is contemplated by and is within the scope of my claim. It is further obvious that various changes may be made in details within the scope of my claim without departing from the spirit of my invention. It is, therefore, to be understood that my invention is not to be limited to the specific details shown and described.

Having thus described my invention, what I claim is:

In combination with a flour mill, a pair of finishing rolls adapted to finely pulverize roughly milled flour, a pair of cutting blades comprising flat elongated steel blades, each having an edge hollow ground to form two cutting edges at the intersection of the sides of a blade with its edge, means for mounting said blades longitudinally with respect to cooperating rolls in substantially pressureless line contact with said rolls.

CLARENCE L. MILLER.